United States Patent [19]

Reynolds

[11] Patent Number: 5,531,493
[45] Date of Patent: Jul. 2, 1996

[54] RELEASABLE LOCKING MECHANISM

[76] Inventor: Amanda Reynolds, 4 Galsworthy Place, Spearwood, Western Australia 6163, Australia

[21] Appl. No.: 284,622
[22] PCT Filed: Feb. 11, 1993
[86] PCT No.: PCT/AU93/00057
§ 371 Date: Nov. 8, 1994
§ 102(e) Date: Nov. 8, 1994
[87] PCT Pub. No.: WO93/15634
PCT Pub. Date: Aug. 19, 1993

[30] Foreign Application Priority Data

Feb. 11, 1992 [AU] Australia ................... PL0858

[51] Int. Cl.⁶ ..................................... E05C 1/00
[52] U.S. Cl. ................. 292/32; 292/39; 292/160
[58] Field of Search ................... 292/32, 39, 42, 292/156, 160, 172; 297/440.1; 403/322

[56] References Cited

U.S. PATENT DOCUMENTS

| | | |
|---|---|---|
| 2,431,105 | 11/1947 | Brinson . |
| 2,474,722 | 6/1949 | Blume .................... 403/322 X |
| 3,910,611 | 10/1975 | Slovensky, Jr. . |
| 4,363,528 | 12/1982 | Olashaw et al. .......... 292/42 X |

FOREIGN PATENT DOCUMENTS

| | | |
|---|---|---|
| 2629508 | 10/1989 | France . |
| 503995 | 12/1954 | Italy ........................ 292/39 |
| 437063 | 10/1935 | United Kingdom . |
| 2203788 | 10/1988 | United Kingdom . |
| 88/07616 | 10/1988 | WIPO . |

Primary Examiner—Rodney M. Lindsey
Attorney, Agent, or Firm—Baker & Daniels

[57] ABSTRACT

Disclosed is a releasable locking mechanism adapted for attachment to an article, such as a chair, to enable demountable connection of the article to a support. The locking mechanism has releasable engaging means for releasably engaging the support, the engaging means being movable between a first "connected" position and a second "disconnected" position to lock or release the article from the support. Also provided is a retracting means for moving the engaging means between the first and second positions and biasing means for biasing the engaging means toward the first position.

15 Claims, 9 Drawing Sheets

RELEASABLE LOCKING MECHANISM

BACKGROUND OF THE INVENTION

The present invention relates to a releasable locking mechanism, and in particular, but not exclusively, to a releasable locking mechanism for incorporation into a child's chair to allow demountable connection of the chair to a plurality of different supports.

There has always been a need to adapt various articles so that they can be safely and demountably connected to corresponding supports. One example of this is in the area relating to children's furniture where articles such as chairs and bassinettes are adapted for demountable connection with stands and other supports. Often the devices used to allow demountable connection such as straps, clips, screws and bolts are difficult or inconvenient to use or require the use of hand tools to operate.

SUMMARY OF THE INVENTION

It is an object of the present invention to provide a releasable locking mechanism for demountably connecting an article to a support which is both easy and convenient to use.

According to the present invention there is provided a releasable locking mechanism adapted for attachment to an article for demountably connecting said article to a support, said locking mechanism comprising:

- engaging means for releasably engaging said support, said engaging means being movable between a first position in which said locking mechanism can be demountably connected with said support and a second position in which said locking mechanism can be disconnected from said support;
- retracting means for retracting said engaging means from said first position to said second position; and,
- biasing means for biasing said engaging means toward said first position;
- whereby, in use, said releasable locking mechanism can demountably connect said article to said support.

Preferably said engaging means is retained in said locking mechanism for sliding movement between said first and second positions.

Preferably said retracting means for retracting said engaging means moves in a direction substantially perpendicular to the direction of movement of said engaging means.

Preferably said locking mechanism further comprises coupling means for coupling said retracting means to said engaging means such that movement of said retracting means causes said engaging means to move between said first and second positions.

Preferably said coupling means comprises a gear rotatably connected to said locking mechanism and wherein said engaging means and said retracting means are maintained in meshing contact with said gear.

Preferably said engaging means comprises at least two arms and said coupling means further comprises a second gear, wherein separate ones of said arms are in meshing contact with respective ones of said gears and said retracting means meshes with both of said gears whereby said retracting means can be manipulated to cause rotation of said gears and thereby slidably move both of said arms between said first and second positions.

Preferably said biasing means is connected with said retracting means such as to urge said engaging means to move toward said first position.

Preferably said releasable locking mechanism further comprises a catch moveable between a first state in which said engaging means is prevented from moving from said first position to said second position, and a second state in which said engaging means is allowed to move from said first position to said second position.

Preferably said catch includes a second biasing means for biasing said catch towards said first state.

Preferably said catch is manipulable for movement between said first and second states at a location remote from that at which said retracting means can be manipulated for movement.

Preferably said catch is operatively connected with said retracting means to selectively control movement of said retracting means.

Preferably said catch comprises an elongate member and first and second elements, wherein said first element is attached to said retracting means and said second element is connected with said elongate member whereby when said catch is in the first state, said first and second elements mutually engage to prevent movement of said retracting means, and when said catch is in said second state, said first and second elements are released from each other thereby allowing movement of said retracting means.

BRIEF DESCRIPTIONS OF THE DRAWINGS

An embodiment of the present invention will now be described, by way of example only, with reference to the accompanying drawings in which.

DETAILED DESCRIPTION

Figure 1:
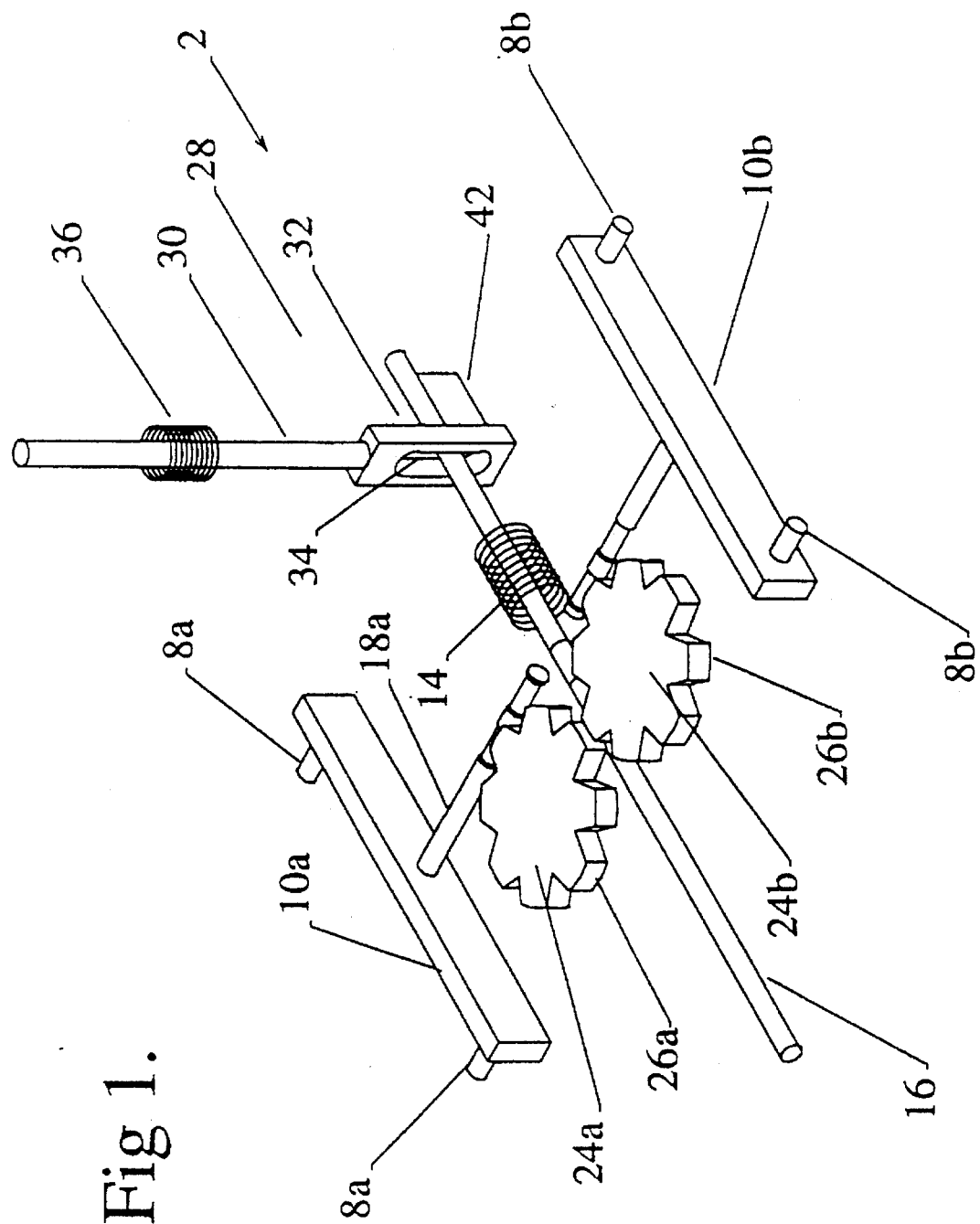
FIG. 1 is a perspective view of the releasable locking mechanism.

As shown in the accompanying drawings, with particular reference to FIGS. 1 to FIG. 3B, a releasable locking mechanism 2 adapted for attachment to an article for demountably connecting the article to a support 4 comprises engaging means 6 in the form of pins 8a, 8b (referred to in general as "pins 8") extending from a side surface of respective arms 10a and 10b (referred to in general as "arms 10"). The pins 8 releasably engage holes 12 in support 4. The support 4 takes the form of two flat metal bars with holes 12 drilled through each bar near its opposite ends. The arms 10a and 10b are retained in the locking mechanism 2 for slidable movement between a first position, illustrated in FIG. 2A, in which the pins 8 engage corresponding holes 12 of the support 4 and a second position, illustrated in FIG. 3A, in which the pins 8 are retracted from holes 12 to disengage the locking mechanism 2 from the support 4. A retracting means in the form of elongate element 16 is provided for retracting the arms 10 from the first position to the second position. A biasing means being, for example, in the form of a coil spring 14 surrounds a length of the elongate element 16 to bias the arms 10 toward the first position illustrated in FIG. 2A. The spring 14 is retained between a stop 15 fixed to the elongate element 16 and a guide 17 through which the elongate element 16 can pass.

Arm 10a is provided with a bar 18a extending from a side of the arm 10a opposite pins 8a in the direction substantially perpendicular to the length of the arm 10a. Arm 10b is provided with a similar bar 18b. The bars 18a and 18b extend towards each other and lie on opposite sides of the elongate element 16. A plurality of notches 20a, 20b is cut into respective ones of bars 18a, 18b near an end distant from its corresponding arm 10. Similar notches 22 are cut intermediate the length, and on opposite sides, of elongate element 16. Two gears 24a and 24b are rotatably connected with the locking mechanism 2 for coupling the elongate element 16 with bars 18a and 18b respectively. Specifically, teeth 26a formed about the circumference of gear 24a, mesh with notches 20a in bar 18a and notches 22 in elongate element 16. Similarly, teeth 26b formed about the periphery of gear 24a mesh with notches 20b formed in bar 18a and notches 22 formed in elongate element 16.

Figure 2B:
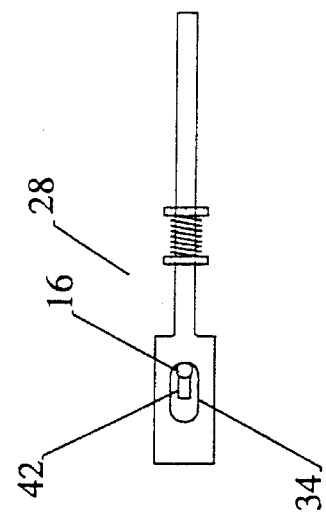
FIG. 2B is an elevation view from the rear of a catch incorporated in the locking mechanism, when the catch is in a first state.
Figure 3B:
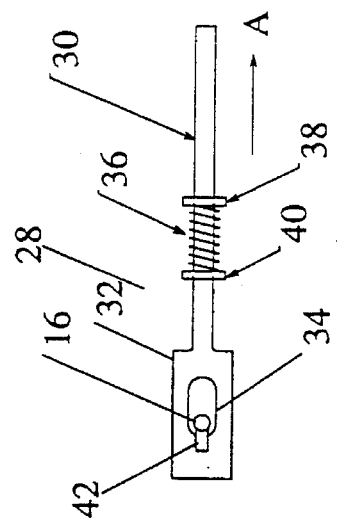
FIG. 3B is an elevation view from the rear of the catch illustrated in FIG. 2B, when the catch is in a second state.

The locking mechanism 2 further includes a catch, designated generally as item 28, which is movable between a first state, illustrated in FIG. 2B, for preventing the arms 10 and pins 8 from moving from the first position to the second position, and a second state, illustrated in FIG. 3B, in which the arms 10 and pins 8 can be moved from the first position to the second position to allow the locking mechanism 2 to be released from the support 4. The catch 28 includes an elongate element 30 terminating at one end in a rectangular plate 32 formed with a central aperture 34. A coil spring 36 surrounds a length of the elongate element 30 and is retained between a stop 38 connected with elongate element 30 and a guide 40 through which the elongate element 30 can pass. The guide 40 is connected with a frame (not shown) supporting other elements of the locking mechanism 2. The catch 28 further includes a tab 42 connected near one end of elongate element 16. When the catch 28 is in the first state, illustrated in FIGS. 2A and 2B, the tab 42 bears against a side of plate 32 opposite spring 14. When in this state, the elongate element 16 is prevented from moving in a direction away from plate 32. The catch 28 can be moved to the second state, illustrated in FIGS. 3A and 3B, by depressing the elongate element 30 causing plate 32 to be displaced relative to tab 42 so that the tab 42 resides wholly within the aperture 34. When in this state, the elongate element 16 is free to be pulled in the direction of its length.

The method of operation of the locking mechanism 2 will now be described in detail.

Figure 2A:
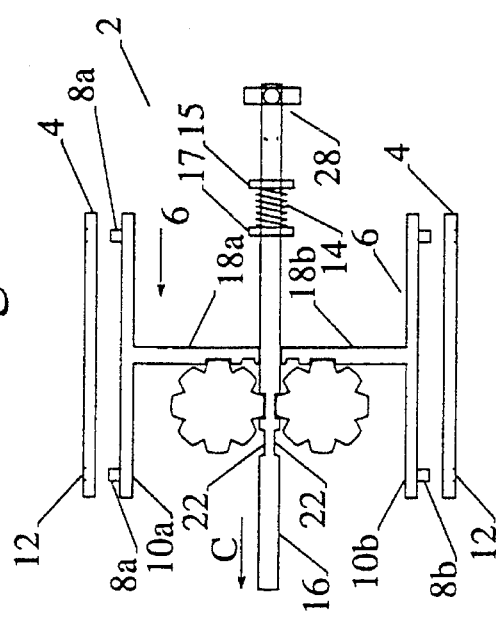
FIG. 2A is a plan view of the releasable locking mechanism when in a first engaging position.
Figure 3A:
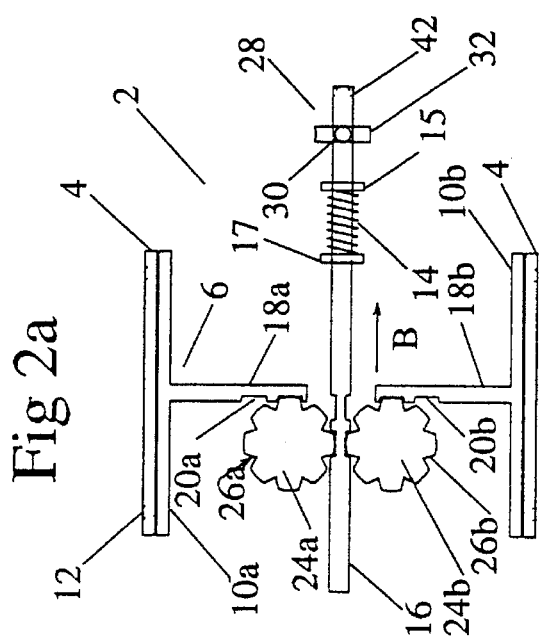
FIG. 3A is a plan view of the releasable locking mechanism in a second disengaged position.

Assume that the mechanism 2 is connected with a support 4 as illustrated in FIG. 2A. The catch 28 is in the first state as illustrated in FIG. 2B thereby preventing the elongate element 16 from being pulled to release the locking mechanism 2 from the support 4. The spring 36 acts to urge the elongate element 30 in the direction of arrow A thereby maintaining the catch 28 in the first state. Spring 14 acts to urge elongate elements 16 in the direction of arrow B to maintain the pins 8 in engagement with holes 12 of the support 4.

In order to disengage the locking mechanism 2 from the support 4, the elongate element 30 must first be depressed against the bias of spring 36 so that tab 42 resides within the aperture 34. This corresponds to the second state of the catch 28 illustrated in FIG. 3B. The elongate element 16 can now be pulled in the direction of arrow C against the bias of spring 14. Pulling of the elongate element 16 causes rotation of the gears 24a and 24b by virtue of the meshing between teeth 26a and 26b and the notches 22. Rotation of the gears 24a and 24b results in bars 18a and 18b and consequently arms 10a and 10b to move in a direction toward the elongate element 16. This is due to the meshing of teeth 26a with notches 20a and the meshing of teeth 26b in notches 20b. In this way the pins 8a and 8b are released from corresponding holes 12 so that the locking mechanism 2 can be released from the support 4.

Figures 4A, 4B:
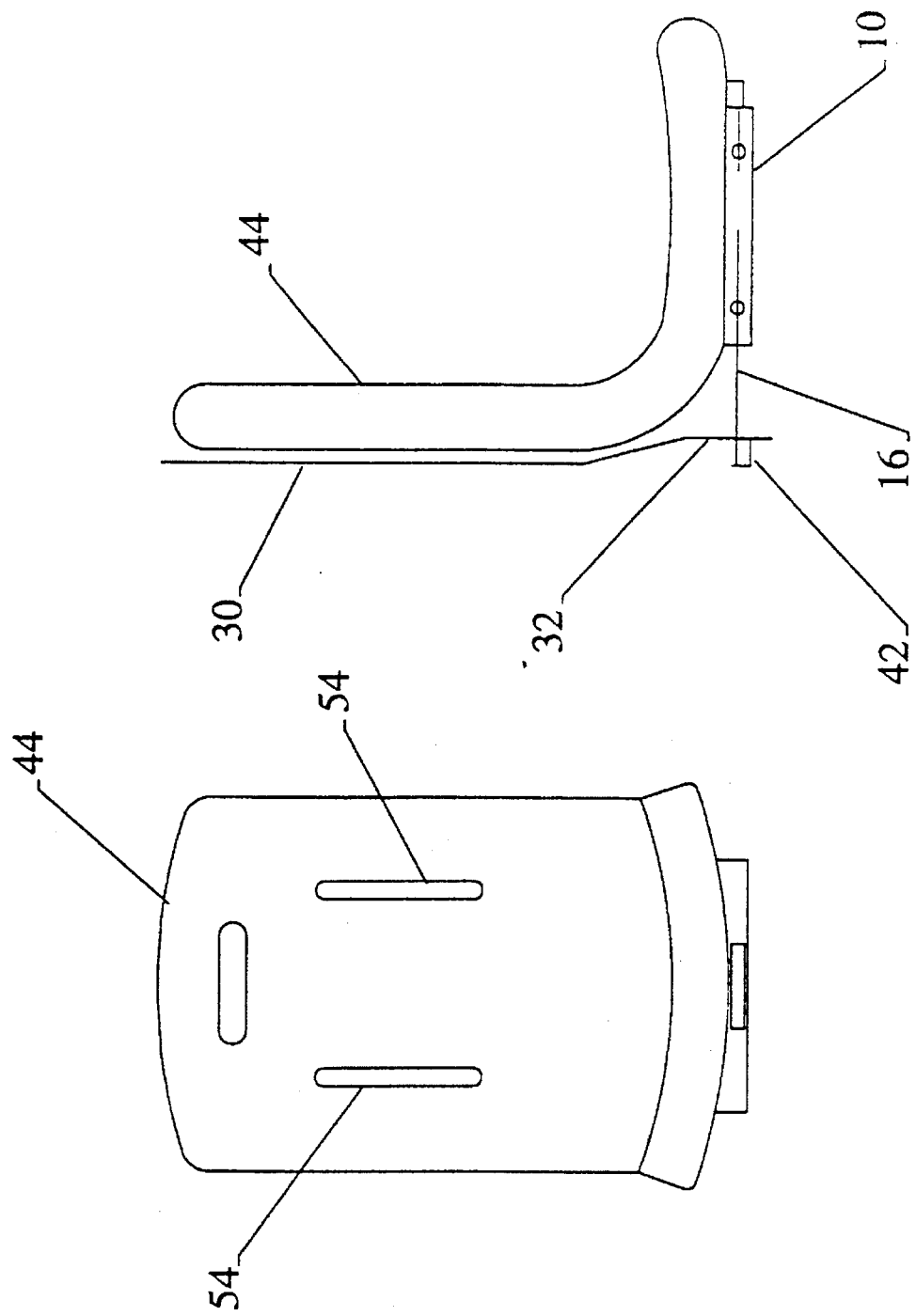
FIG. 4A is a front elevation view from the front of a chair incorporating the locking mechanisms.
FIG. 4B is an elevation view from the side of the chair illustrated in FIG. 4A.

It is envisaged that the locking mechanism 2 can be incorporated into a chair 44 as illustrated in FIGS. 4A and B. A chair-shaped frame (not shown) is provided for supporting the locking mechanism 2. The arms 10, bars 18, elongate element 16 and gears 24, are connected with a seat part of the frame and the elongate element 30 is connected with a back part of the frame. The frame is then connected to the convex surface of the chair 44. A chair-shaped backing plate (not shown) can be used to cover the locking mechanism 2 by attachment to the chair 44. That is, the locking mechanism 2 can be integrated into a chair per se. In such an embodiment, an underside of the seat part of the chair is provided with two elongate slots to allow insertion of supports 4 for demountably locking the chair to the support.

Figures 6A, 6B:
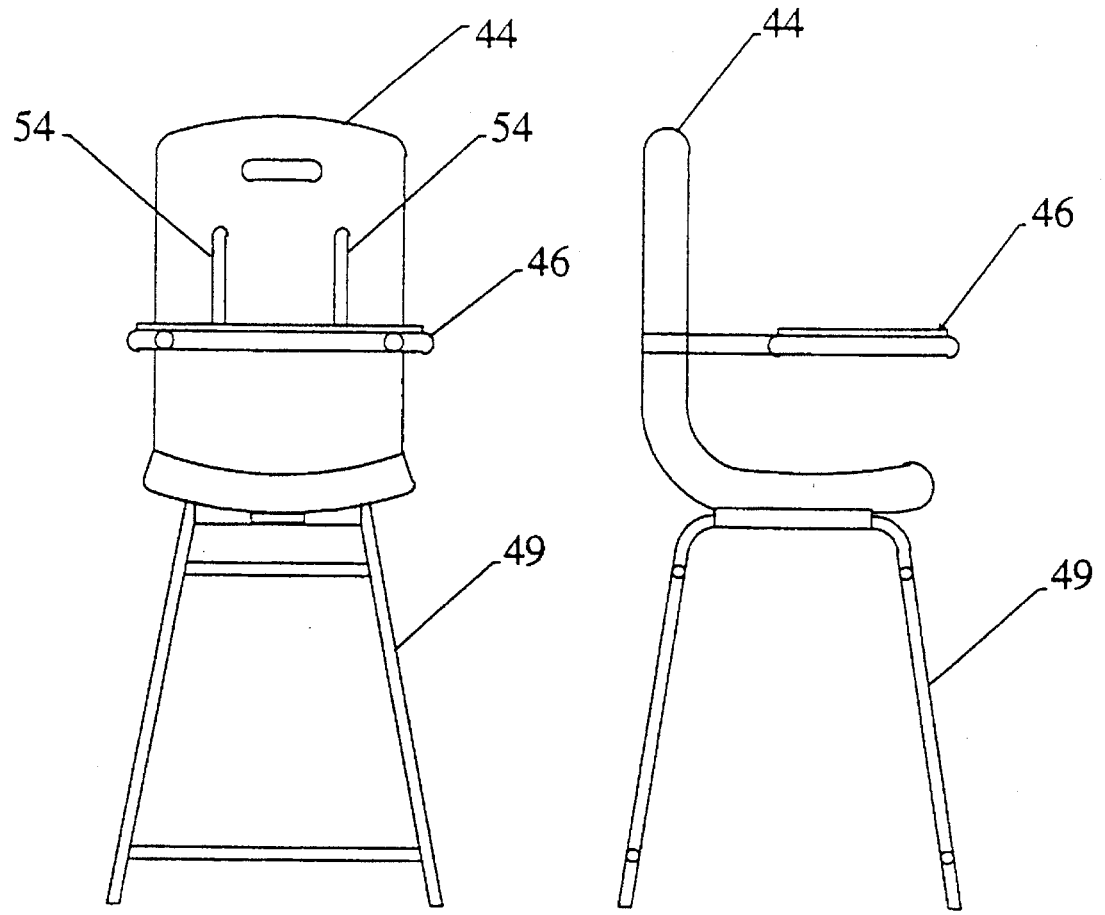
FIG. 6A is an elevation view from the front of a high-chair incorporating the seat of FIGS. 4A and 4B.
FIG. 6B is a side elevation view of the high chair illustrated in FIG. 6A.
Figure 7:
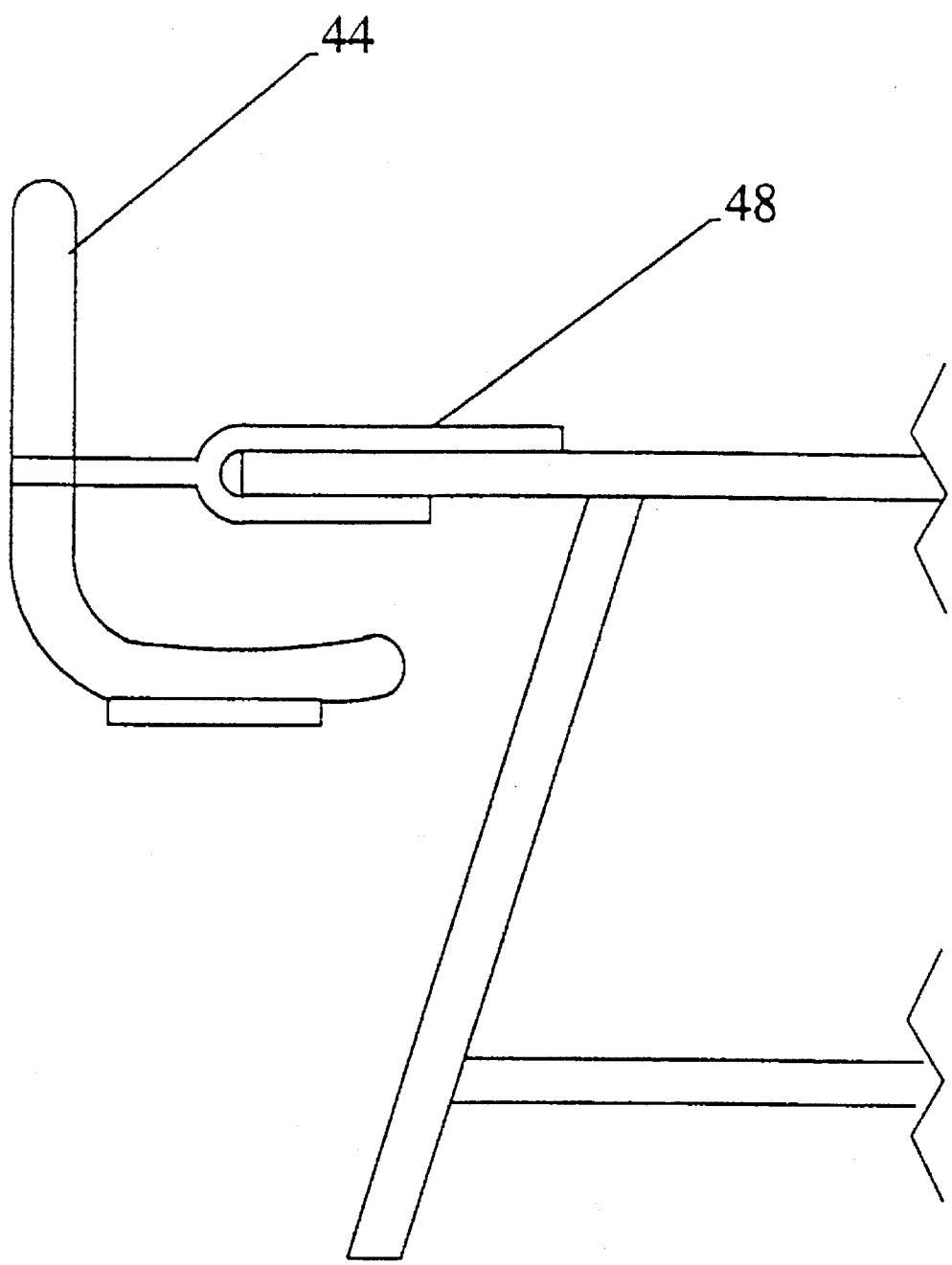
FIG. 7 is a side elevation view of the chair illustrated in FIGS. 4A and 4B connected with a table.

It is further envisaged that the locking mechanism 2 include a second engaging means operated by the elongate element 30 to allow demountable connection to other items such as, for example, a tray 46 (illustrated in FIGS. 6A and B) or a table support arm 48 (shown in FIG. 7). The further engaging means can be substantially the same as pins 8 and arms 10 and can be operated by means of gears meshing with notches formed in the elongate element 30.

In a simpler alternative, a cross-member (not shown) can be connected with elongate element 30 in a plane substantially perpendicular to that containing arms 10 and elongate element 60. Opposite ends of the cross-member can be provided with engaging elements for engaging complementary elements formed in the tray 46 or table support arm 48.

Figure 8:
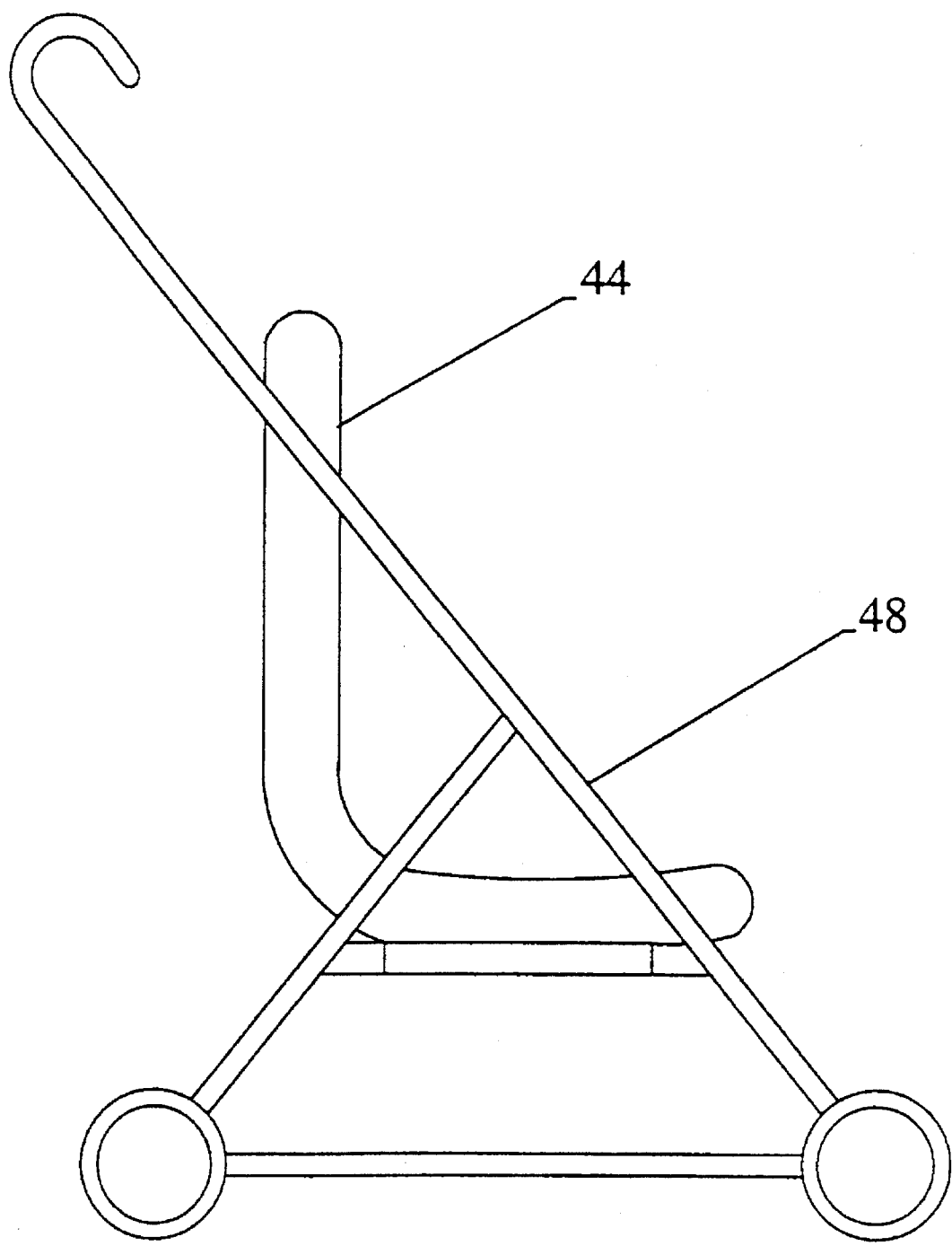
FIG. 8 is a side elevation view of the chair illustrated in FIGS. 4A and 4B connected with a stroller.
Figure 9:
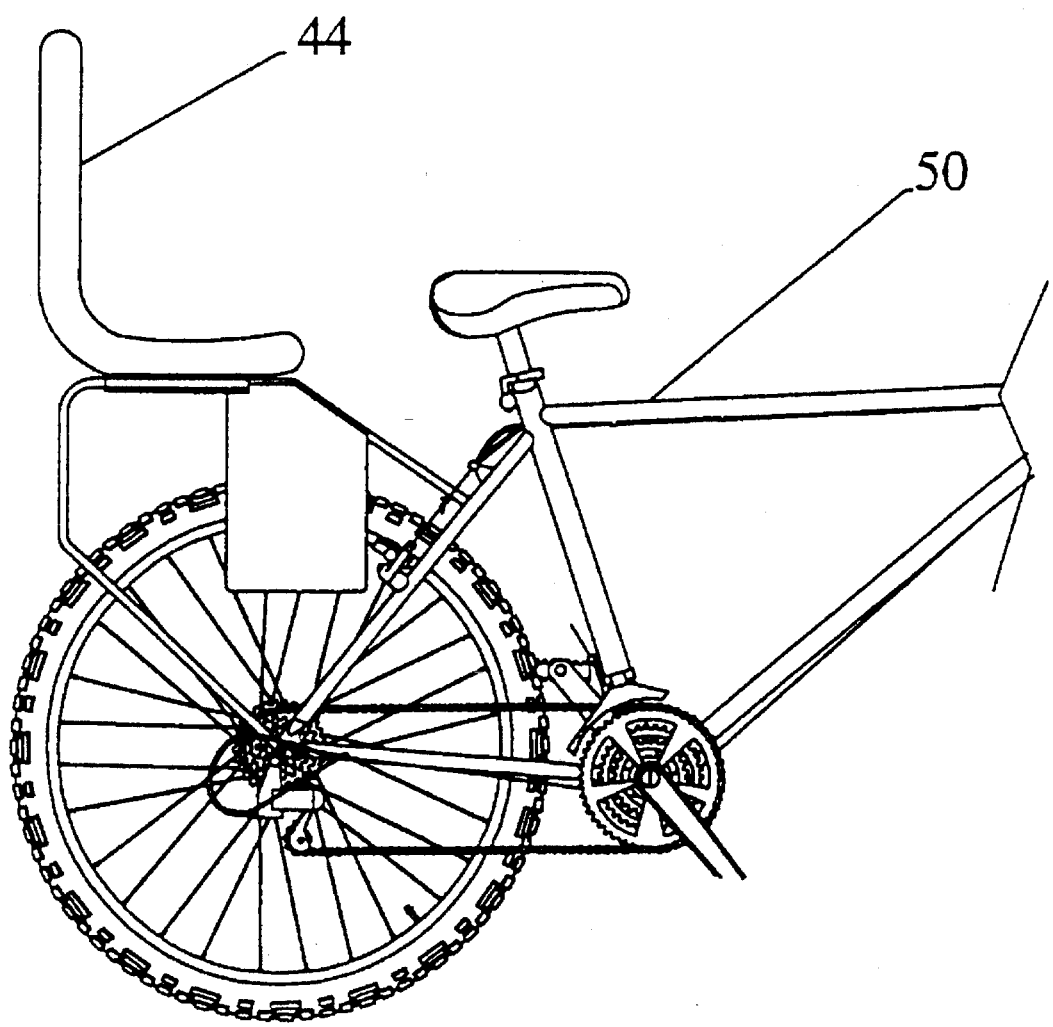
FIG. 9 is a side elevation view of the chair illustrated in FIGS. 4A and 4B connected with a bicycle; and, FIG. 10 is a side elevation view of a chair illustrated in FIGS. 4A and 4B connected with a swing.
Figure 10:
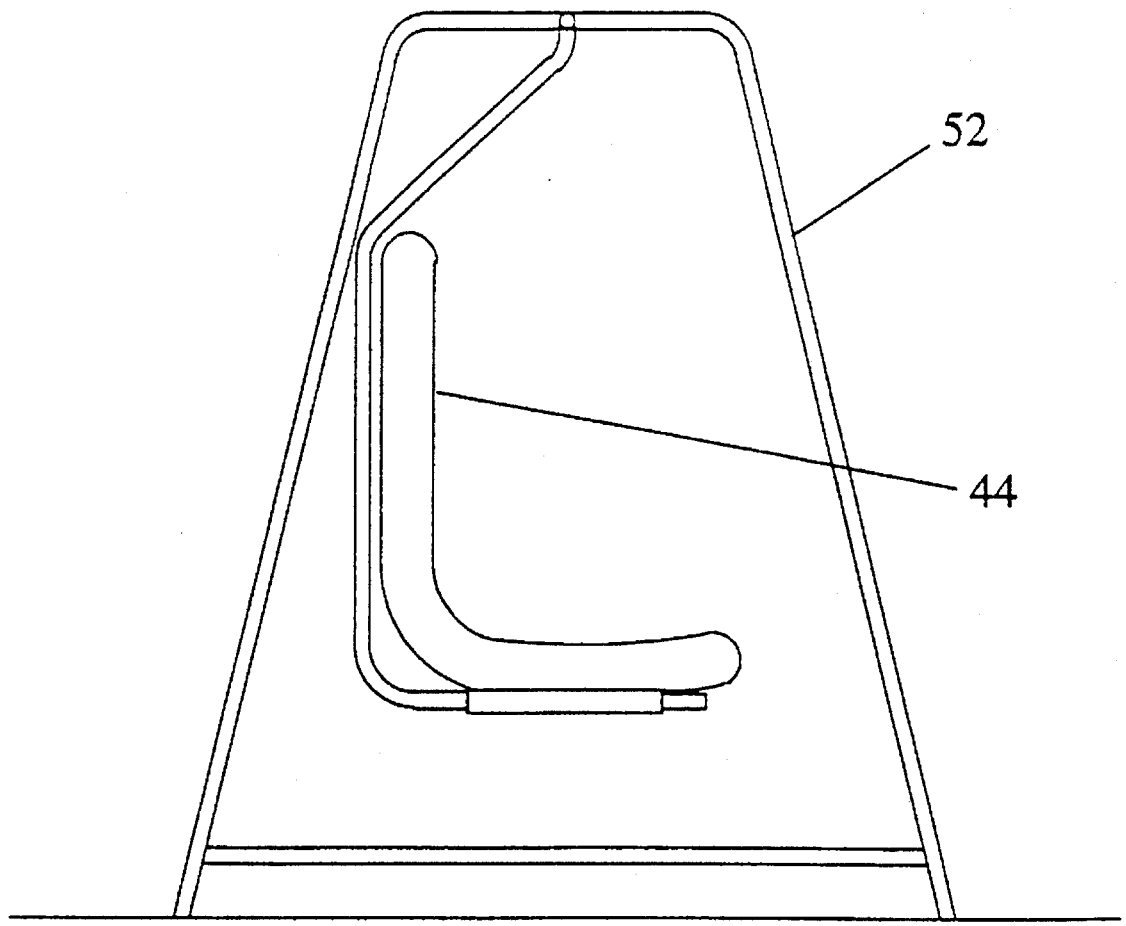

The supports 4 can be incorporated into a number of different apparatuses to allow connection of chair 44 provided with the locking mechanism 2 to those apparatuses. For example, a support 4 can be incorporated into a chair 47 (illustrated in FIGS. 5A and 5B), a high chair 49 (illustrated in FIGS. 6A and 6B) stroller 48 (as shown in FIG. 8), a bicycle frame 50 (as shown in FIG. 9) or a swing 52 (as shown in FIG. 10) so as to allow the chair 44 to be demountably connected thereto. The chair 44 is provided with a number of longitudinal slots 54 (refer FIGS. 4A, 5A, 6A) in its back to allow the use of harness for strapping in users of the chair 44.

Now that an embodiment of the present invention has been described in detail, it will be apparent to those skilled in the relevant arts that numerous modifications and variations may be made without departing from the basic inventive concepts. For example, the locking mechanism 2 is illustrated as including a catch 28. However, as the purpose of the catch is merely to prevent accidental release of the locking mechanism 2 from the support 4, its inclusion is not essential. Furthermore, any other conventional catch can be used in place of the aperture and tab arrangement shown. In addition, the gears 24a, 24b can be replaced with any other device for translating movement of the elongate member 16 to movement of the arms 10. For example, a pulley system may be used.

The embodiment employing the pulley system replaces the above-described gears with pulleys and cables connecting the pins 8 with the elongate element 16. Again, the catch 28 is biased by a spring into the first engaged position and pins 8 are also spring loaded, urging them into engagement with support 4.

In order to disengage the locking mechanism 2 from the support 4 the catch 28 must be released, allowing the elongate element 16 to be pressed forward thus rotating the pulleys and tensioning the cables thus causing the pins 8 to move against the bias of their complementary springs to be released from the support 4. The locking mechanism 2 can then be removed from the support 4.

Figures 5A, 5B:
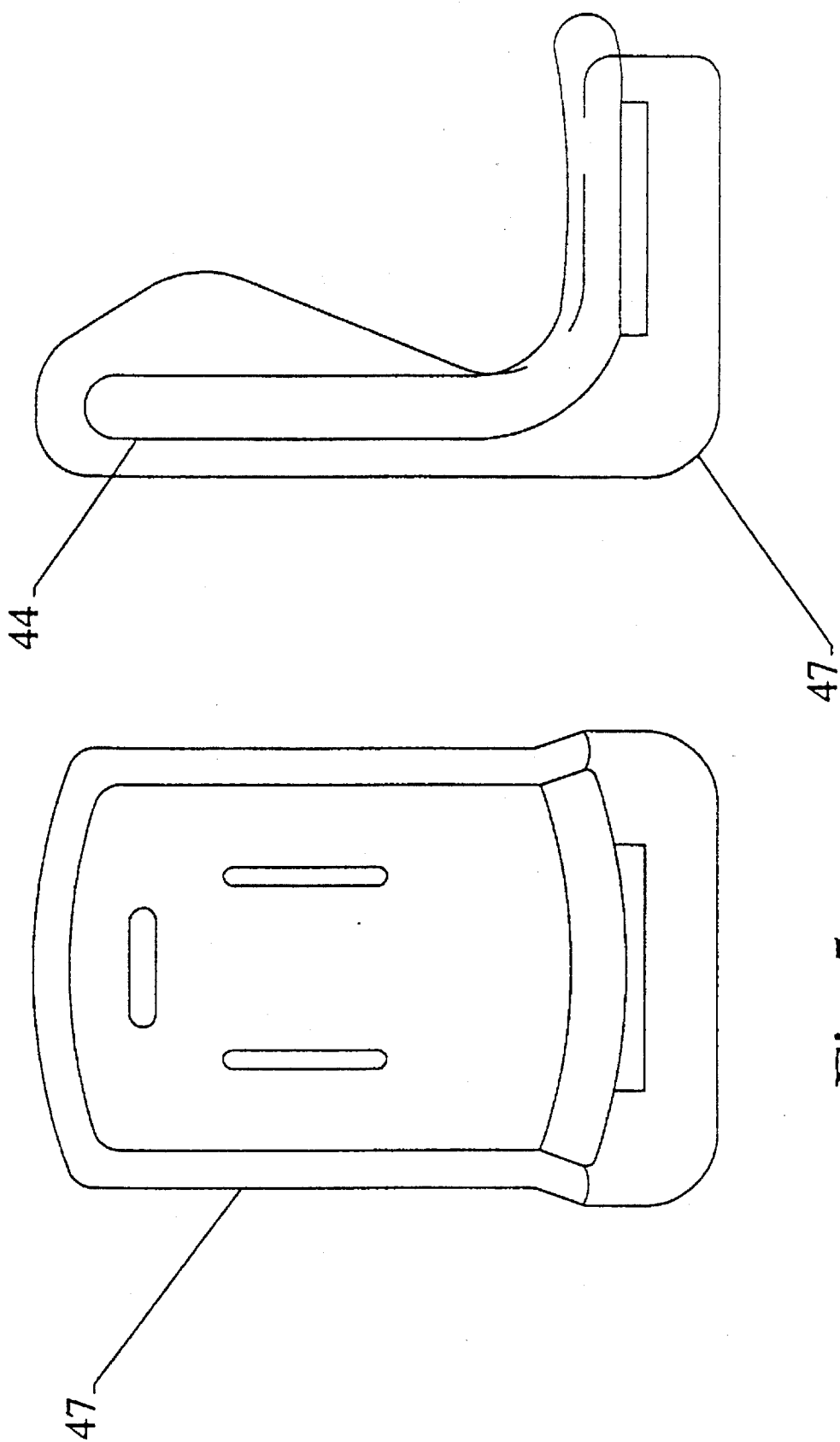
FIG. 5A is a front elevation view of the chair illustrated in FIG. 4A and 4B connected to a supporting seat.
FIG. 5B is an elevation view from the side of the seat illustrated in FIG. 5A.

If, as contemplated in the above-described embodiment, there are provided four pins, each pin has an associated pulley and cable connecting the pin with the elongate element 16. If, as is shown in FIGS. 5A and 5B the support 4 is incorporated into a chair 47 facing the front of a vehicle, the pins 8 may lie along two axis parallel to the longitudinal axis of the vehicle. The rear pulleys controlling the rear pins connecting the support to the chair may be further secured by use of a locking pin. Similarly, the front pulleys could be locked in this manner, further securing the support.

A further alternative to the gear system involves the replacement of gears with Z-shaped members connected by cables to elongate element 16 and pins 8 located at the front and rear of the support 4 rather than to the sides as discussed above. Thus, when the catch 28 is released, the elongate element 16 may be pressed forward allowing the Z-shaped members to rotate thus pulling the cables in a direction which causes the pins 8 to be released from the support 4. Similarly, pulling the elongate element 16 will allow the pins 8, which are spring loaded to move into engagement with the support.

Further, the article to be connected to the support need not be a chair, it could be a capsule or bassinette. The chair may also be tilted to form such a capsule or bassinette, if desired.

All such modifications and variations are considered to be within the scope of the present invention.

The claims defining the invention are as follows:

1. A releasable locking mechanism to demountably connect an article with a support, said mechanism comprising:

at least one engaging means to releasably connect said article and said support, said at least one engaging means being movable between a first position in which the article is connected with said support and a second position in which the article is disconnected from said support thereby enabling removal of said article therefrom;

retracting means to retract said engaging means from said first position to said second position;

biasing means to bias said engaging means toward said first position; and coupling means for coupling said retracting means to said engaging means such that movement of said retracting means causes said engaging means to move between said first and second positions, wherein said coupling means comprises a rotatable gear and wherein said engaging means and said retracting means are maintained in meshing contact with said gear.

2. A connection mechanism as claimed in claim 1 wherein a plurality of engaging means are provided to connect said article with said support at a plurality of locations.

3. A releasable locking mechanism as claimed in claim 2 wherein said engaging means is retained in said locking mechanism for sliding movement between said first and second positions.

4. A releasable looking mechanism as claimed in claim 1 wherein said engaging means is retained in said locking mechanism for sliding movement between said first and second positions.

5. A resealable locking mechanism as claimed in claim 4 wherein said retracting means for retracting said engaging means moves in a direction substantially perpendicular to the direction of movement of said engaging means.

6. A releasable locking mechanism as claimed in claim 5 wherein said biasing means is connected with said retracting means such as to urge said engaging means to move toward said first position.

7. A releasable locking mechanism as claimed in claim 4 wherein said biasing means is connected with said retracting means such as to urge said engaging means to move toward said first position.

8. A releasable locking mechanism as claimed in claim 1 wherein said engaging means comprises at least two arms and said coupling means further comprises a second gear, wherein separate ones of said arms are in meshing contact with respective ones of said gears and said retracting means meshes with both of said gears whereby said retracting means can be manipulated to cause rotation of said gears and thereby slidably move both of said arms between said first and second positions.

9. A releasable locking mechanism as claimed in claim 1 wherein said biasing means is connected with said retracting means such as to urge said engaging means to move toward said first position.

10. A releasable locking mechanism as claimed in claim 9 further comprising a catch movable between a first state in which said engaging means is prevented from moving from said first position to said second position, and a second state in which said engaging means is allowed to move from said first position to said second position.

11. A releasable locking mechanism to demountably connect an article with a support, said mechanism comprising:

at least one engaging means to releasably connect said article and said support, said at least one engaging means being movable between a first position in which the article is connected with said support and a second position in which the article is disconnected from said support thereby enabling removal of said article therefrom;

retracting means to retract said engaging means from said first position to said second position;

biasing means to bias said engaging means towards said first position; and a catch movable between a first state in which said engaging means is prevented from moving from said first position to said second position, and a second state in which said engaging means is allowed to move from said first position to said second position.

12. A resealable locking mechanism as claimed in claim 11 wherein said catch includes a second biasing means for biasing said catch towards said first state.

13. A releasable locking mechanism as claimed in claim 11 wherein said catch is manipulable for movement between said first and second states at a location remote from that at which said retracting means can be manipulated for movement.

14. A releasable locking mechanism as claimed in claim 11 wherein said catch is operatively connected with said retracting means to selectively control movement of said retracting means.

15. A releasable locking mechanism as claimed in claim 11 wherein said catch comprises an elongate member and first and second elements, wherein said first element is attached to said retracting means and said second element is connected with said elongate member whereby, when said catch is in the first state, said first and second elements mutually engage to prevent movement of said retracting means, and when said catch is in said second state, said first and second elements are released from each other thereby allowing movement of said retracting means.

* * * * *